(12) United States Patent
Morris et al.

(10) Patent No.: US 6,425,540 B1
(45) Date of Patent: Jul. 30, 2002

(54) METHOD AND APPARATUS FOR GRINDING RUBBER

(76) Inventors: Charles D. Morris, 1224 S. Lincoln Ave., Montgomery, IL (US) 60538; Daniel A. Nagel, 40W 978 Rte. 30, Aurora, IL (US) 60506; Lorin H. Beaber, 3276 Ault Rd. NE., Mineral City, OH (US) 44656; Raymond K. Tharp, Jr., 5763 Middle Run Rd., NE., Dover, OH (US) 44622

(*) Notice: Subject to any disclaimer, the term of this patent is extended or adjusted under 35 U.S.C. 154(b) by 0 days.

(21) Appl. No.: 09/516,005

(22) Filed: Feb. 29, 2000

(51) Int. Cl.[7] ............................................. B02C 19/12
(52) U.S. Cl. ................ 241/65; 241/278.1; 241/DIG. 31
(58) Field of Search ...................... 241/278.1, DIG. 31, 241/65, 23, 24.27; 451/449, 450, 455, 488

(56) References Cited

U.S. PATENT DOCUMENTS

| | | | |
|---|---|---|---|
| 97,041 A | * 11/1869 | Burghardt | ................ 241/278.1 |
| 892,808 A | 7/1908 | Carr | |
| 984,758 A | * 2/1911 | Gardner | ............... 241/DIG. 31 |
| 2,712,842 A | 7/1955 | Fahrni | |
| 3,658,267 A | * 4/1972 | Burwell | ............... 241/DIG. 31 |
| 3,948,449 A | 4/1976 | Logan et al. | |
| 4,113,186 A | * 9/1978 | Smith | ................... 241/DIG. 31 |
| 4,314,425 A | * 2/1982 | Bricker et al. | |
| 4,383,650 A | * 5/1983 | Contal et al. | ........ 241/DIG. 31 |
| 4,405,090 A | * 9/1983 | Wakeem | ............. 241/DIG. 31 |
| 4,619,078 A | * 10/1986 | Uhlig | |
| 4,813,614 A | 3/1989 | Moore et al. | |
| 4,862,647 A | * 9/1989 | Vieau | |
| 5,299,744 A | 4/1994 | Garmater | |
| 5,443,413 A | * 8/1995 | Pflager et al. | |
| 5,495,988 A | * 3/1996 | Follese et al. | |
| 5,661,883 A | * 9/1997 | Kajiura | |
| 5,695,131 A | 12/1997 | Wenzel | |
| 5,791,979 A | 8/1998 | Duncan et al. | |
| 6,015,105 A | * 1/2000 | Brewer | ................ 241/DIG. 31 |

* cited by examiner

*Primary Examiner*—Mark Rosenbaum
(74) *Attorney, Agent, or Firm*—McAndrews, Held & Malloy, Ltd.

(57) ABSTRACT

A rubber grinding machine and method is provided for ambient temperature grinding of rubber material to form finely ground rubber particles. The rubber grinding machine includes a feed tube, a grinding module, a conveyor, a screening module and a vacuum system. Rubber material is placed in the feed tube which advances the rubber material into the grinding module using a plunger or auger. The grinding module includes a grinding wheel which grinds the rubber material into rubber particles. The grinding wheel is surrounded by a shroud which includes a water-cooled cooling jacket. The water is circulated through the cooling jacket to cool the shroud and its interior. Rubber particles ground by the grinding wheel fall through the bottom of the shroud onto a conveyor which deposits the rubber particles onto the screen module. The screen module includes at least one screen for separating the rubber particles by size. Rubber dust produced by the grinding wheel is processed by a vacuum system and may later be screened.

23 Claims, 3 Drawing Sheets

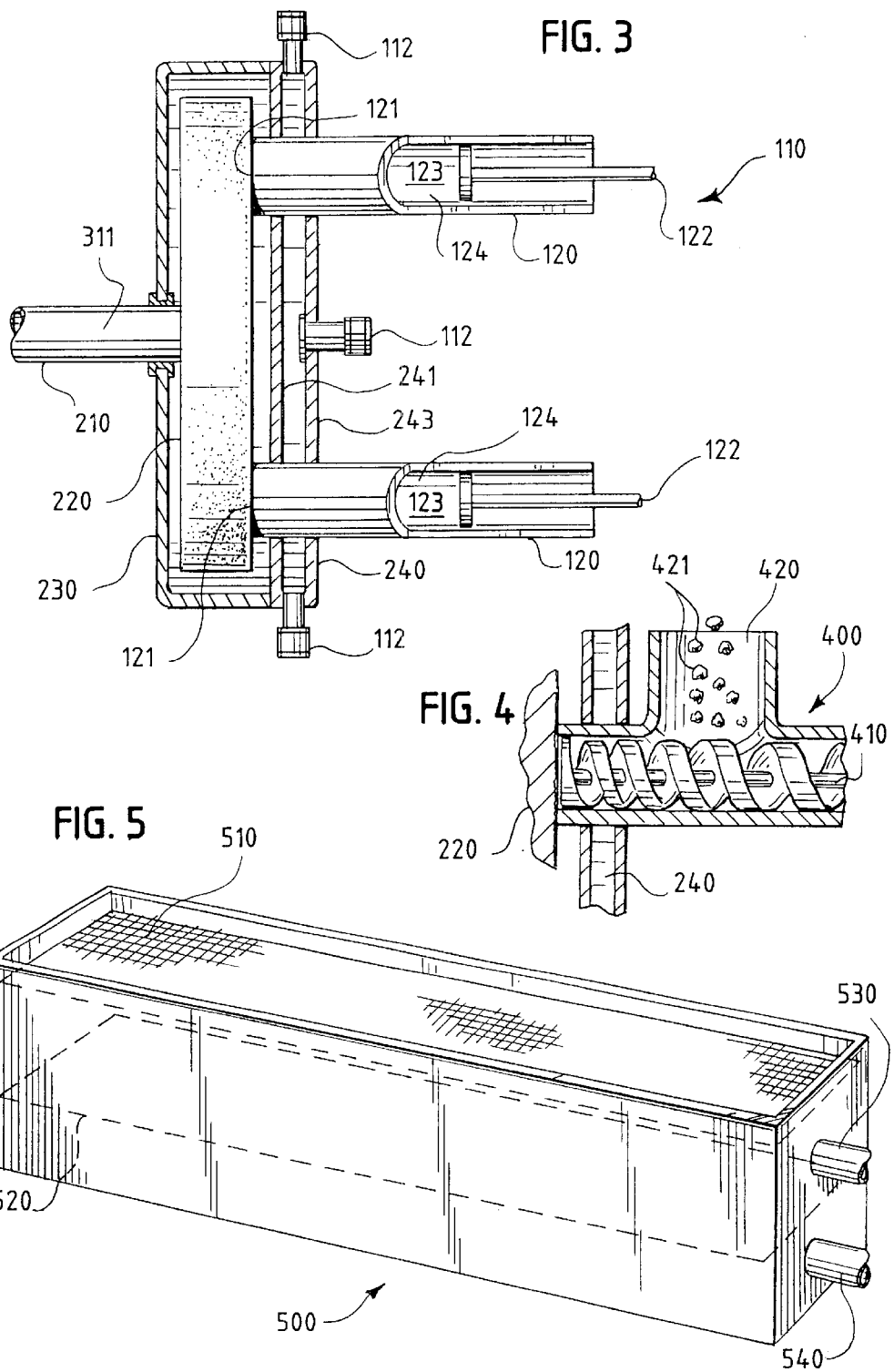

METHOD AND APPARATUS FOR GRINDING RUBBER

BACKGROUND OF THE INVENTION

The present invention relates to a rubber granulating machine and method, and more particularly to a process and apparatus for grinding rubber or similar material. The rubber or similar material is ground into a usable or marketable end product such as rubber powder that may be used in the rubber industry.

The disposal or reuse of previously used rubber products, such as rubber tires, presents many problems. Ecologically, rubber tires degrade very slowly and if disposed of improperly, may lead to hazardous environmental conditions in terms of both potential ground water problems and other ecological effects. Recently, recycling of pre-used +rubber products has increased in popularity in order to avoid potential negative environmental impact as well as to provide potentially commercially reusable rubber products.

Several methods for recycling used rubber products exist. Often, rubber products such as rubber tires are rendered into dust or fine particulate rubber which then may be reused in other rubber products. However, one of the difficulties with recycling rubber products such as tires is that such products are extremely durable and consequently difficult to reduce to a re-usable form. In order for any recycling effort to be cost effective, a method must be developed to reduce the extremely durable rubber products to a form of rubber that may be useable in further generating processes. Recycled rubber particles become more commercially valuable with decreasing particle size. The commercial value increases because rubber particles of smaller sizes may be more easily incorporated into a wider variety of new rubber products.

U.S. Pat. No. 4,813,614 issued to Moore et al. entitled, "Method and Apparatus for Treating Waste Products to Recover the Components Thereof" illustrates an early method for recovering rubber particles from pre-used rubber products such as tires. In Moore, used products such as used rubber tires are frozen using liquid nitrogen and are then crushed. The particles are re-frozen and re-crushed in successive stages to yield finer and finer rubber particles. The crushed output is then separated with regard to the size of the crushed particles and crushed particles may then be sold and/or reused based upon their size. In order to lower the temperature of the rubber tires sufficiently so that the rubber tires behave more solidly and less elastically so that the rubber tires may be crushed, Moore relies on a large quantity of liquid nitrogen. Liquid nitrogen is, of course, expensive to use. Thus, although the Moore process may yield fine particulate rubber, it is quite expensive.

U.S. Pat. No. 5,695,131 issued to Wenzel entitled "Shredder Separator" illustrates another device for recycling used rubber products such as rubber tires. The shredder separator of Wenzel includes a number of rotating blades that cut or shred a tire into small pieces. The shredding separator of Wenzel operates at ambient (i.e., generally room temperature) and thus avoids the expensive liquid nitrogen cooling steps of Moore. However, the product output by Wenzel's shredder is undoubtedly inferior to the product output by Moore for use in new rubber products because of the larger output size of the rubber particles. Because the shredder relies on a number of rotating blades rather than successive crushing steps, the recycled rubber particles are far larger than the rubber particles of Moore and consequently less commercially desirable for many applications. While large size particles may be suitable to such applications such as playground flooring and the like, the output of Wenzel is less suitable for reconstitution into new rubber products. By comparison, the fine rubber particles of Moore may be considerably more easily and economically incorporated into new rubber products.

U.S. Pat. No. 5,299,744 to Garmater entitled "Granulating Separating and Classifying Rubber Tire Materials" illustrates a further system for recycling used rubber tires. As with Wenzel, Garmater includes a rotating cutter wheel for reducing large chunks of tire into smaller chunks which may be reusable for some purpose such as ground cover for playgrounds, jogging trails, and the like. As with Wenzel, the rubber particles produced by Garmater are fairly large and maybe suitable for ground cover applications rather than applications such as reconstitution into new rubber products.

Thus, rubber recycling reclamation or granulating machines may be classified into two types. A first type produces fairly large rubber particles and operates at room temperature, often using rotating knives or knives of some sort to produce the particles. The process is fairly inexpensive. However, the large rubber particles produced, while usable for applications such as ground cover, are not generally usable for more commercially desirable applications such as new rubber products. A second type of rubber reclamation is the type shown in Moore in which the machinery operates at extremely lower temperatures and produces fine particles. Because the process operates at low temperatures, the process is fairly expensive. The rubber particles produced, however, may be employed in new rubber products.

Additionally, although the processes of Wenzel and Garmater may produce some small amount of fine particles, for example as a byproduct of the process, such particles are a very small fraction by weight of the output of the process. Only a small fraction of the total rubber material processed using the processes of Wenzel or Garamater may yield fine particle sizes.

Thus, a need exists for an improved method and apparatus for reducing rubber products such as pre-used rubber products, into fine grain particles with a high process efficiency. A need has especially existed for such a method and apparatus able to operate with lower cost.

It is therefore an object of the present invention to minimize the expense of producing commercially reusable rubber particles by providing a cost-effective, generally ambient temperature process that eliminates costly liquid nitrogen freezing.

SUMMARY OF THE INVENTION

These and other objects are accomplished in a rubber grinding machine and method which operates at generally ambient temperature and produces fine grain rubber particles at a low cost. Rubber material advances into a grinding module where the rubber material is ground into rubber particles via a rotating grinding wheel. A shroud surrounds the wheel to capture and direct the ground material as well as to cool the grinding wheel. Rubber particles ground by the wheel gravitate through the bottom of the shroud and onto a conveyor. The conveyor moves the particles into a screen module where the particles are separated by size. Rubber dust produced by the grinding wheel is collected by a vacuum system and may be later screened as well.

Thus, finely ground rubber particles are created which are suitable for incorporation into new rubber products. The rubber particles are produced cheaply and efficiently.

These and other features of the present invention are discussed or apparent in the following detailed description of preferred embodiments of the invention.

BRIEF DESCRIPTION OF THE DRAWINGS

FIG. 3 is a cutaway top view of the grinding module of FIG. 2.

FIG. 4 is a partial, cutaway side view of an alternative embodiment of the machine of FIG. 1.

FIG. 5 is a perspective view of an alternative screening module of the machine of FIG. 1.

DETAILED DESCRIPTION OF THE PREFERRED EMBODIMENTS

Figure 1:
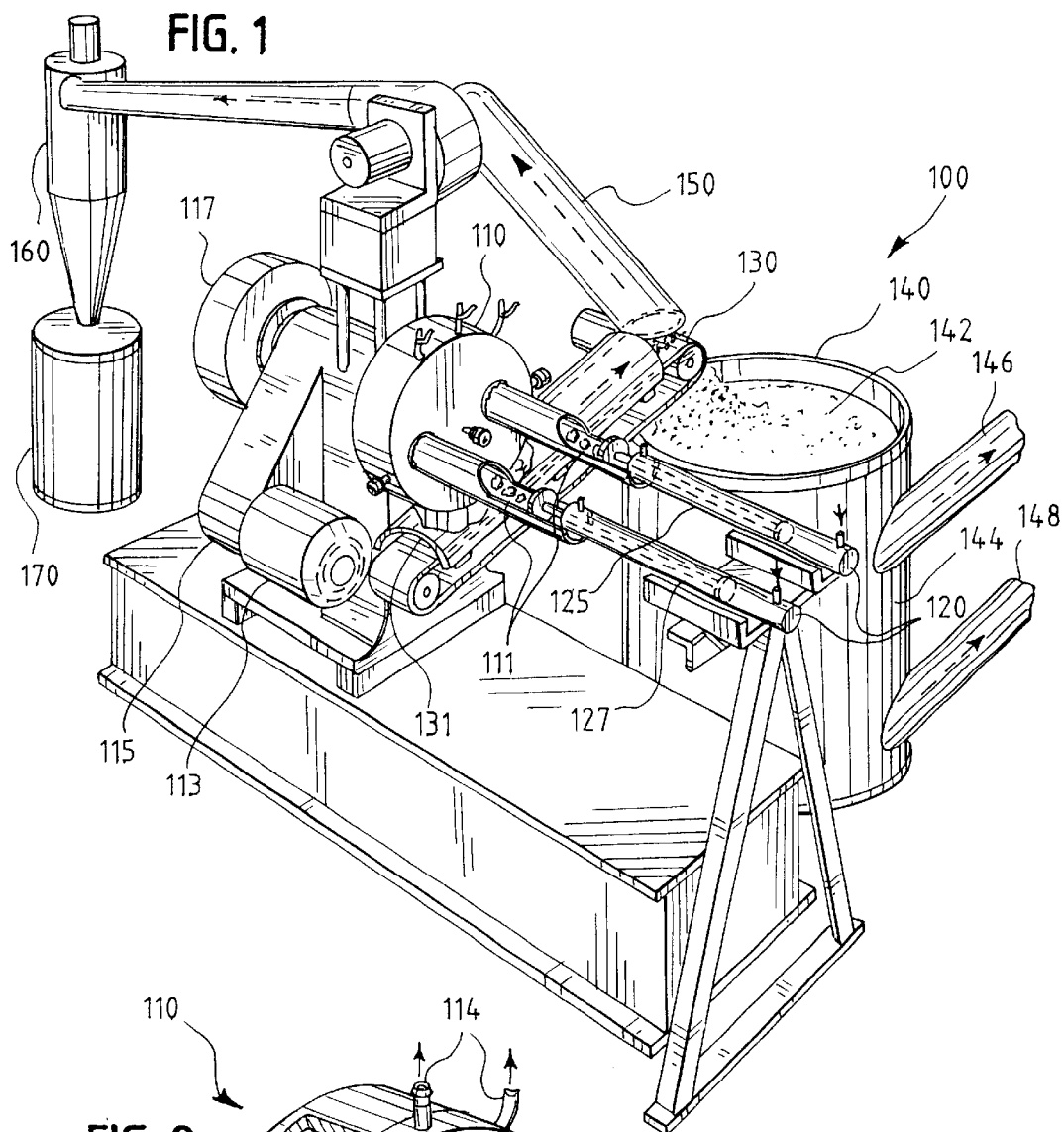
FIG. 1 is a perspective view of an embodiment of a rubber grinding machine according to the present invention.

Referring to FIG. 1, a rubber grinding machine 100 includes a grinding module 110 where rubber is ground into fine particles. A pair of feed tubes 120 forces rubber material 111 into grinding module 110, from which ground particles exit and are transported via a conveyor 130 to a screening module 140. A dust collection pipe 150 together with a cyclone air system 160 and a dust collection bin 170 cooperate to collect rubber dust particles.

Figure 2:
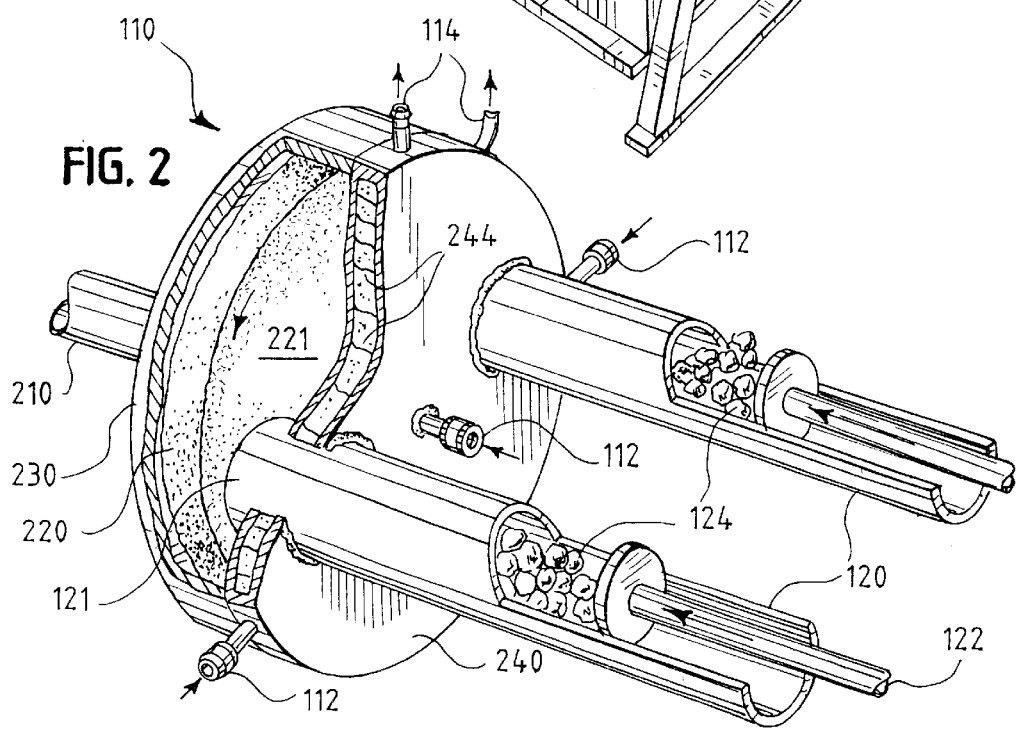
FIG. 2 is a cutaway perspective view of a grinding module of the machine of FIG. 1.

Referring to FIGS. 2 and 3, grinding module 110 includes an axle 210 which drives a grinding wheel 220. Wheel 220 is affixed to axle 210 which is rotated by a motor 113 (FIG. 1) and drive belt assembly 115 (FIG. 1). If desired, another grinding module 117 (FIG. 1) may be driven by axle 210, motor 113 and drive belt assembly 115.

An enclosed cylindrical shaped shroud 230 entirely encompasses the grinding wheel as shown in FIGS. 2 and 3. A cooling jacket 240 is positioned at the distal end of shroud 230 and cools the wheel during the grinding process. Cooling jacket 240 includes a plurality of water inlet pipes 112 and a plurality of water outlet pipes 114, of which two of a preferred three are shown.

The cooling jacket 240 is formed by a pair of spaced apart, circular walls 241, 243 which create an open cylindrical cavity. A number of internal baffles 244 may be placed in the jacket between walls 241, 243 and may aid in assisting heat transfer, and/or providing structural support to the jacket. Cold water or other liquid is introduced into cooling jacket 240 through water inlet pipes 112. The water or other liquid exits cooling jacket 240 through water outlet pipes 114.

As shown in FIG. 2, feed tubes 120 pass completely through cooling jacket 240 and have each of their terminal ends 121 disposed in a plane adjacent the general plane of the outer surface 221 of grinding wheel 220. Each feed tube 120 is cylindrical in shape having its center axis parallel to the axis 311 (as shown in FIG. 3) of grinding wheel 220.

A pair of plungers 122 are slidably disposed in tubes 120. Each plunger 122 includes a circular disk mounted at a distal end and sized to move along the inner surface 123 of the tubes. A portion of each tube 120 is removed to provide a feed location 124 where rubber material may be manually inserted into the tube. Each plunger is pneumatically driven by pneumatic cylinders 125, 127 (FIG. 1).

In operation, rubber material is loaded into the material feed locations 124 of the feed tubes 120 as shown. Plungers 122 of the feed tubes advance the rubber material toward grinding wheel 220 of grinding module 110. Plungers 122 press or force the rubber material against the outer surface 221 of grinding wheel 220 causing the rubber material to be ground up into fine rubber particles. Grinding wheel 220 generates rubber dust as well as other sized particles of rubber material.

The terminal edges of the feed tubes 120 are generally in contact with outer surface 221 of the grinding wheel, as shown in FIG. 3. However, the outer surface 221 of grinding wheel 220 is not flat, but has a grinding grain. Because the grinding surface 221 is not flat, the contact between the edges of the feed tubes 120 and the surface 221 is not continuous. As the wheel rotates, gaps develop between the edges of the feed tubes 120 and the grinding wheel 220 and allow ground rubber particles to escape from the feed tubes 120 and into the shroud 230.

In operation, the shroud 230 and the grinding wheel 220 are cooled by water flowing through the cooling jacket 240. The grinding of rubber by the grinding wheel 220 produces heat or thermal energy. The thermal energy heats the interior space of the shroud 230 and the shroud 230 itself. The shroud 230 and the cooling jacket 240 are preferably composed of a thermally conductive material, such as steel.

Cooling jacket 240 is physically directly connected to the shroud 230 and is thus thermally coupled to the shroud. The cooling jacket 240 is cooled by the flow of water through the cooling jacket 240. Because the cooling jacket 240 is thermally coupled to the shroud 230, the flow of water into and out of the cooling jacket 240 cools the shroud 230 and its interior space.

The circulation of water through cooling jacket 240 via the inlet and outlet pipes serves to maintain the cooling jacket 240 at a low temperature thus providing cooling to the entire grinding module 110. The cooling provided by the cooling jacket allows the grinding to be performed at generally room temperature without expensive cooling systems. The present invention is thus considerably more cost effective than prior art system relying on freezing systems or liquid nitrogen.

Referring again to FIG. 1, once the rubber material has been ground by grinding wheel 220, the ground rubber material falls through an aperture 131 formed in the lower section of shroud 230 and onto conveyor 130. Material falling onto the conveyor 130 is moved by the conveyor to screening module 140. At the screening module 140, the ground rubber material falls from the conveyor 130 onto a screen 142 which is disposed on top of a retention bin 144. Screen 142 extends completely across the top of retention bin 144. Screen 142 has uniform apertures of a size chosen so that larger pieces of rubber material are unable to pass through screen 142 so as to be separated on top of the retention bin 144. Larger particles may be sorted for sale, or may be re-introduced into the material feed location 124 of a feed tube 120 to produce smaller particles. Smaller pieces of rubber material fall through the screen 142 to a lower level of the retention bin 144 where the particles may be removed via an output 146.

Overly large particles may be blocked by the screen 142 while particles of an acceptable size may fall through the screen 142. The screening module 140 may include another screen (not shown), oriented like the screen 142 and vertically disposed in a horizontal plane between the first output 146 and a second output 148. The second screen may be composed of a finer mesh in order to further separate ground rubber particles based on size. Rubber particles that are too large to pass through the second screen may be removed from retention bin 144 through output 146. Rubber particles that are small enough to pass through the second screen may be removed from the retention bin 144 through a second output 148.

The action of the grinding wheel 220 generates a rubber "dust or powder." The rubber dust may include rubber particles that have been reduced to a size where the force of air motion, such as the air motion generated by the grinding wheel 220, temporarily overcomes the force of gravity on the rubber particle and the rubber particles become airborne. The present invention preferably yields 95%–97% dust at 70 mesh minus. Seventy mesh minus is a term of the art indicating that the dust will pass through a one-square-inch mesh of 70 holes horizontally by 70 holes vertically. The present invention yields at least 40 mesh minus dust particles.

Referring to FIG. 1, the conveyor 130 may be enclosed in whole or part. An enclosure 131 which is U-shaped in configuration, directs the dust particles to the dust collection pipe 150. Airborne dust is pulled along the enclosure 131 and into the dust collection pipe 150 by air pressure generated by a vacuum system, preferably a cyclone air system 160. The dust collection pipe 150 conveys dust to the cyclone air system 160 where the dust is circulated inside the dust collection bin 170 and reclaimed. As the cyclone system 160 circulates the dust, the dust empties into the dust collection bin 170 which is preferably a 55-gallon drum. The dust collection bin 170 preferably forms a packaging container such as a 55-gallon drum or other packaging container so that the packaging container and enclosed dust may be easily transported and sold. Additionally, rubber dust particles may be further screened before being packaged and sold. Particles larger than a desired size may be re-introduced to the grinding module. The shroud 230 is directly connected to the enclosure 131 as shown. The enclosure 131 preferably overlaps the edges of the conveyor 130 and may preferably extend underneath the upper belt of the conveyor 130 as shown.

FIG. 4 illustrates another embodiment of a feed tube 400. Instead of the plunger 122 of FIGS. 1–3, feed tube 400 includes an auger 410 and a material feed port 420. In operation, material 421 is added to the material feed port 420. The material falls into the auger 410. As auger 410 is rotated about its axis, the material is advanced by the rotation of the auger and forced into contact with the grinding wheel 220.

FIG. 5 illustrates an alternative screening module 500. The screening module is rectangular in shape as opposed to the circular shape of the screening module 140 of FIG. 1. The screening module 500 includes an upper screen 510, a lower screen 520, a first rubber particle outlet 530 and a second rubber particle outlet 540. Similar to the screening module 140 of FIG. 1, ground material is relayed from the grinding module 110 to screening module 500 via conveyor belt 130. As with the screening module 140 of FIG. 1, ground material falls upon upper screen 510. Material that is too large to pass through the upper screen 510 remains on top of the upper screen 510. Material small enough to fit through the screen 510 falls through the upper screen 510 and is incident upon the lower screen 520. Material that is small enough passes through the lower screen 520. Material passing through the upper screen 510 but not passing through the lower screen 520 is removed from the screening module 500 via the first rubber particle output 530. Material passing through both the upper screen 510 and the lower screen 520 is removed from the screening module 500 via the second rubber particle output 540. Preferably the screening module 500 is approximately four feet wide by 25 feet in length. The mesh of the upper screen 510 may have a mesh size and the mesh size may be one of several sizes ranging down to preferably 70 mesh. The lower screen may also range in mesh down to 100 mesh. As will suggest itself, screening module 500 may be shaken by means (not shown) to facilitate screening.

Figure 6:
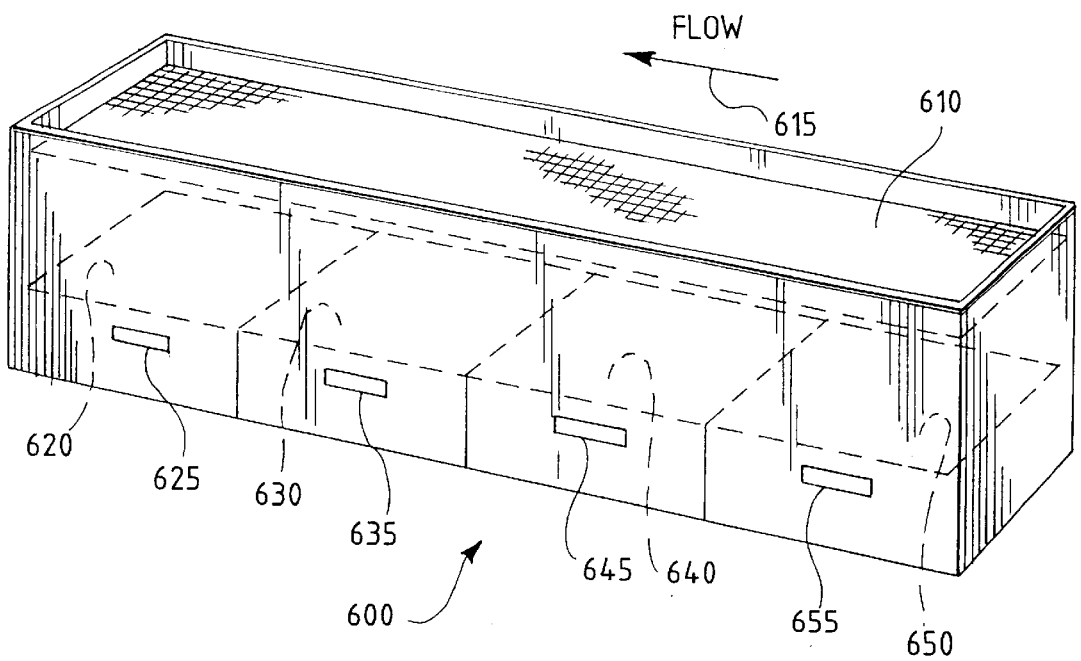
FIG. 6 is a perspective view of an alternative screening module of the machine of FIG. 1.

FIG. 6 illustrates another alternative exemplary screening module 600. The screening module 600 is rectangular in shape, similar to the screening module 500 of FIG. 5, and is in the form of a shaker table. The screening module 600 is shaken and the ground material flows in the direction of the arrow 615. The screening module 600 includes a main screen 610; four sub-screens 620, 630, 640, 650; and four particle output shoots, 625, 635, 645, 655. Similar to the screening module 500 of FIG. 5, ground material is relayed from the grinding module 110 to screening module 600 where the ground material falls upon the main screen 610. Material that is too large to pass through the main screen 610 remains on top of the main screen 610 and may be periodically retrieved and re-introduced into the grinding module 110.

Material small enough to fit through the main screen 610 falls through the main screen 610 to the sub-screens 620, 630, 640, 650. The sub-screens 620, 630, 640, 650 may be screens of different sizes with each sub-screen 620, 630, 640, 650 positioned on top of a single chamber. For example, when material is added to the screening module 600 in the flow direction 615, material falls downwardly onto sub-screen 650 and then moves laterally across sub-screens 640, 630 and 620 in succession. Sub-screens 620, 630, 640, 650 are ordered so that the sub-screen 650 has the smallest mesh and that sub-screens 640, 630, and 620 have consecutively larger meshes. Thus, the exemplary screening module 600 may separate material into five sizes, a first size too large to pass through the main screen 610, and four consecutively smaller sizes, corresponding to the four sub-screens 620, 630, 640, 650. Material may be removed from the chamber below each sub-screen 620, 630, 640, 650 using the corresponding particle output shoot 625, 635, 645, 655.

The present invention thus provides an improved machine and method for reducing rubber, and similar material products such as pre-used rubber products, into fine grain particles. The present invention is especially cost effective because the present invention may produce fine particles suitable for incorporation into new rubber products without using the expensive cooling and freezing processes of the prior art. The present invention operates at generally ambient temperatures thus alleviating the need for expensive liquid nitrogen freezing steps, while providing a high percentage of finely ground rubber particles usable in many commercial applications.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. A rubber grinding apparatus for generating ground rubber particles from rubber material, comprising:

a rotatable grinding wheel;

a feeder for advancing rubber material against said grinding wheel;

a shroud enclosing said grinding wheel, said shroud having an aperture for directing ground rubber particles away from said grinding wheel during rotation thereof; and a cooler in thermal contact with said grinding wheel for cooling thereof.

2. A rubber grinding apparatus according to claim 1 further including:
a mover adjacent said aperture for conveying rubber particles away from said grinding wheel; and
a separator adjacent to said mover for separating rubber particles based on size.

3. A rubber grinding apparatus according to claim 2 wherein said mover includes a conveyor belt.

4. A rubber grinding apparatus according to claim 2 wherein said mover includes an auger.

5. A rubber grinding apparatus according to claim 2 wherein said separator includes a vacuum system for processing airborne rubber dust particles.

6. A rubber grinding apparatus according to claim 5 wherein said vacuum system is a cyclone system.

7. A rubber grinding apparatus according to claim 1 wherein said feeder includes a feed tube.

8. A rubber grinding apparatus according to claim 7 wherein said feed tube includes a plunger for forcing rubber material against said grinding wheel.

9. A rubber grinding apparatus according to claim 8 wherein said plunger is pneumatically movable toward said grinding wheel.

10. A rubber grinding apparatus according to claim 7 wherein said feed tube includes an auger for forcing rubber material against said grinding wheel.

11. A rubber grinding apparatus according to claim 1 wherein said cooler is liquid-cooled.

12. A rubber grinding apparatus according to claim 11 wherein said cooler comprises a liquid-filled cavity.

13. A rubber grinding apparatus according to claim 12 wherein said cooler includes at least one liquid inlet and at least one liquid outlet to allow circulation of liquid into and out of said cooler.

14. A rubber grinding apparatus according to claim 1 wherein said cooler is physically connected to said shroud.

15. A rubber grinding apparatus according to claim 2 wherein said separator includes a screen module.

16. A rubber grinding apparatus according to claim 15 wherein said screen module includes at least two screens of different mesh sizes.

17. A rubber grinding apparatus according to claim 16 wherein said screen module separately outputs rubber particles passing through two screens from rubber particles passing through one screen.

18. A rubber grinding module including;
a grinding wheel for grinding rubber;
a feeder for directing rubber material to said grinding wheel;
a shroud surrounding said grinding wheel; and
a cooling jacket thermally coupled to said shroud for cooling said grinding wheel.

19. The rubber grinding apparatus of claim 18 wherein said cooling jacket is liquid-cooled.

20. The rubber grinding apparatus of claim 18 wherein said cooling jacket comprises a liquid-filled cavity.

21. The rubber grinding apparatus of claim 20 wherein said cooling jacket includes at least one liquid inlet and at least one liquid outlet to allow circulation of liquid.

22. A rubber grinding apparatus for generating ground rubber particles from rubber material, comprising:
a rotatable grinding wheel;
a feeder for advancing rubber material against said grinding wheel;
a shroud enclosing said grinding wheel, said shroud having an aperture for directing ground rubber particles away from said grinding wheel during rotation thereof; and
a cooler in thermal contact with said shroud for cooling thereof.

23. A rubber grinding module including;
a solid grinding rubber;
a feeder for directing rubber material to said grinding wheel;
a shroud surrounding said grinding wheel; and
a cooling jacket thermally coupled to said shroud for cooling said grinding wheel.

* * * * *

UNITED STATES PATENT AND TRADEMARK OFFICE
CERTIFICATE OF CORRECTION

PATENT NO. : 6,425,540 B1
DATED : July 30, 2002
INVENTOR(S) : Charles D. Morris et al.

It is certified that error appears in the above-identified patent and that said Letters Patent is hereby corrected as shown below:

Column 6,
Line 61, after the word "a" insert -- solid --

Column 8,
Line 35, after the word "grinding" insert -- wheel for grinding --

Signed and Sealed this

Twenty-ninth Day of July, 2003

JAMES E. ROGAN
*Director of the United States Patent and Trademark Office*